(12) United States Patent
Hsiao

(10) Patent No.: US 7,746,422 B2
(45) Date of Patent: Jun. 29, 2010

(54) LIQUID CRYSTAL DISPLAY DEVICE HAVING HOOKS FOR FIXING LAMP REFLECTOR

(75) Inventor: Chih-Chung Hsiao, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 169 days.

(21) Appl. No.: 11/894,131

(22) Filed: Aug. 20, 2007

(65) Prior Publication Data

US 2008/0043168 A1    Feb. 21, 2008

(30) Foreign Application Priority Data

Aug. 18, 2006   (TW) ............................... 95130447 A

(51) Int. Cl.
*G02F 1/1333*   (2006.01)
(52) U.S. Cl. ............................. 349/67; 349/58; 349/61; 349/62

(58) Field of Classification Search ................... 349/67
See application file for complete search history.

(56) References Cited

U.S. PATENT DOCUMENTS

| | | | |
|---|---|---|---|
| 5,815,227 A * | 9/1998 | Lee ............................ | 349/67 |
| 6,867,827 B2 | 3/2005 | Cha et al. | |
| 7,275,852 B2 * | 10/2007 | Kim et al. ................... | 362/612 |

* cited by examiner

*Primary Examiner*—Charlie Peng
*Assistant Examiner*—Erin D Chiem
(74) *Attorney, Agent, or Firm*—Wei Te Chung

(57) ABSTRACT

An exemplary liquid crystal display device (100) includes a first frame (11), a liquid crystal panel (12), a backlight unit (13) for providing uniform light for the liquid crystal panel, and a second frame (14) cooperating with the first frame to define a space receiving the liquid crystal panel and the backlight unit. The backlight unit includes a reflector (17) and a lamp (16) received in the reflector. The reflector includes a hook (175). The second frame includes a through hole (145). The hook engages in the through hole, thereby facilitating the fixing of the reflector to the second frame.

4 Claims, 6 Drawing Sheets

LIQUID CRYSTAL DISPLAY DEVICE HAVING HOOKS FOR FIXING LAMP REFLECTOR

FIELD OF THE INVENTION

The present invention relates to liquid crystal display (LCD) devices, and particularly to an LCD device in which a lamp reflector is fixed by means of a hook engaging in a hole.

BACKGROUND OF THE INVENTION

A typical LCD has the advantages of portability, low power consumption, and low radiation, and has been widely used in various portable information products such as notebooks, personal digital assistants (PDAs), video cameras and the like.

Referring to FIG. 7, this shows a conventional LCD device. The LCD device 700 includes a metal top bezel 71, an LCD panel 72, a backlight unit 73 for providing uniform light for the LCD panel 72, and a metal bottom frame 74. The top bezel 71 and the bottom frame 74 cooperatively form a space to accommodate the LCD panel 72 and the backlight unit 73.

The bottom frame 74 includes a rectangular bottom plate 741, a first side plate 742, and a second side plate 743 opposite to the first side plate 742. The side plates 742, 743 perpendicularly extend from the bottom plate 741. The bottom plate 741 has two first screw holes 744 formed in two corners thereof adjacent to the first side plate 742.

The backlight unit 73 includes a light guide plate 75, a linear lamp 76 adjacent to the light guide plate 75, a metal reflector 77, a pair of rubber stoppers 78, and a plastic frame 79. The reflector 77 essentially surrounds three sides of the lamp 76, and reflects light emitted from the lamp 76 toward the light guide plate 75. The light guide plate 75 receives the light from the lamp 76 and the reflector 77, and guides the light to emit from a top surface of the light guide plate 75. The rubber stoppers 78 are engaged around two ends of the lamp 76 to protect and fix the lamp 76. The plastic frame 79 is used to accommodate the light guide plate 75, the lamp 76, the reflector 77, and the rubber stoppers 78.

The reflector 77 includes two second screw holes 774 corresponding to the first screw holes 744, respectively.

Referring also to FIG. 8 and FIG. 9, when the LCD device 700 is assembled, the rubber stoppers 78 are engaged around the ends of the lamp 76 respectively. The rubber stoppers 78 together with the lamp 76 are received in the reflector 77. The reflector 77 is placed on the bottom plate 741 adjacent to the first side plate 742. The first screw holes 744 are aligned with the second screw holes 774 respectively. The reflector 77 is fixed to the bottom frame 74 by means of engagement of two screws (only one shown, not labeled) in the corresponding first screw holes 741 and the corresponding second screw holes 774.

The need for the screws contributes to making the process of assembly of the LCD device 700 somewhat complicated. It is desired to provide a new LCD device which can overcome this above-described deficiency.

SUMMARY

In one embodiment, a liquid crystal display device includes a first frame, a liquid crystal panel, a backlight unit, and a second frame cooperating with the first frame to define a space receiving the liquid crystal panel and the backlight unit. The backlight unit includes a reflector and a lamp received in the reflector. The reflector includes a hook. The second frame includes a through hole. The hook engages in the through hole and thereby facilitating fixing of the reflector to the second frame.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments of the present invention in detail.

Figure 1:
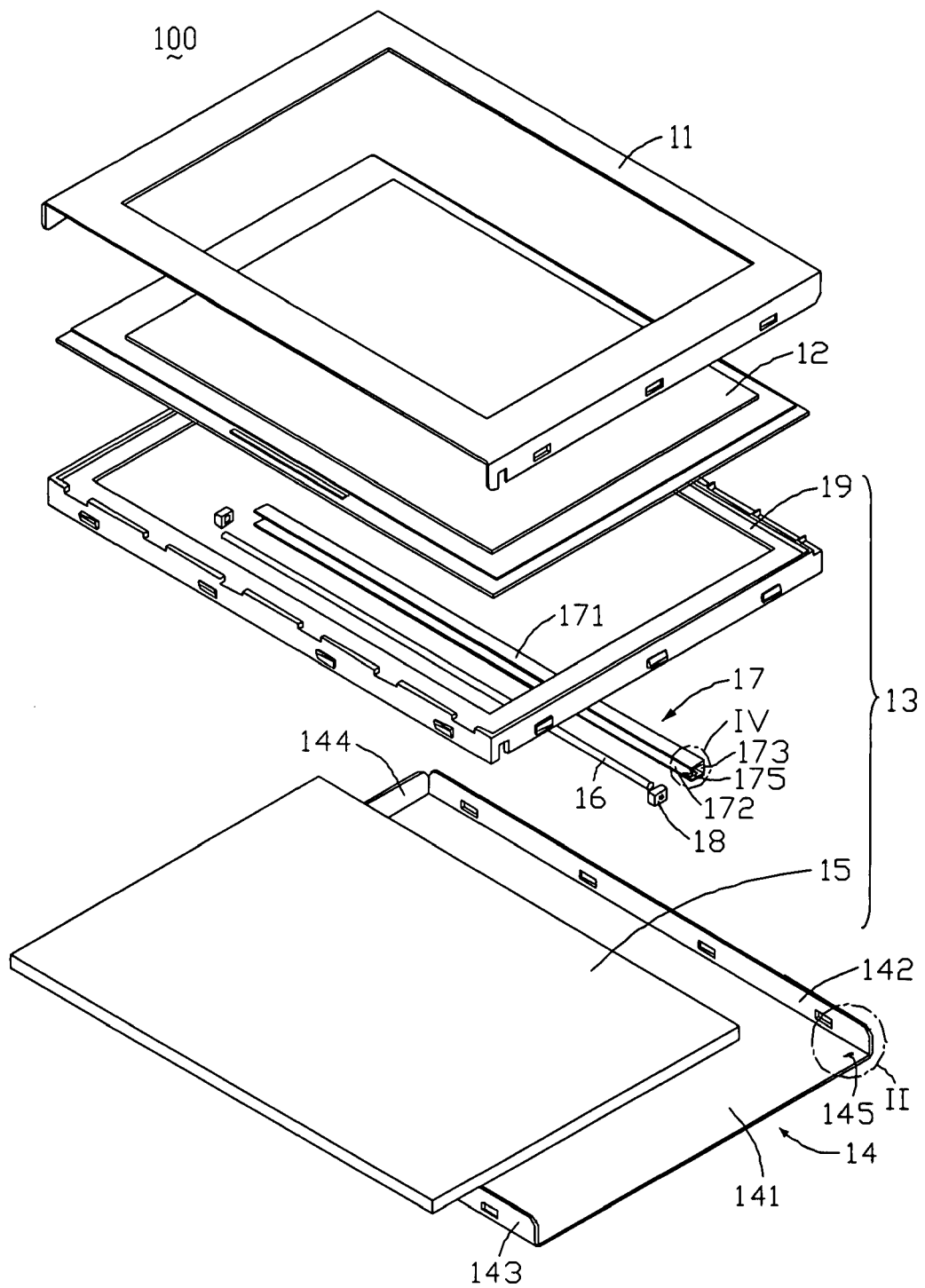
FIG. 1 is an exploded, isometric view of a liquid crystal display (LCD) device according to an exemplary embodiment of the present invention, the LCD device including a reflector and a bottom frame.

Referring to FIG. 1, an LCD device 100 according to an exemplary embodiment of the present invention is shown. The LCD device 100 includes a top bezel 11, an LCD panel 12, a backlight unit 13, and a bottom frame 14. The top bezel 11 and the bottom frame 14 cooperatively form a space to accommodate the LCD panel 12 and the backlight unit 13.

The bottom frame 14 is typically made of iron or another kind of metal. The bottom frame 14 includes a rectangular bottom plate 141, a first side plate 142, a second side plate 143, and a third side plate 144. The three side plates 142, 143, 144 respectively extend up from the bottom plate 141. The first side plate 142 is opposite to the second side plate 143. The third side plate 144 connects with both the first side plate 142 and the second side plate 143. The bottom plate 141 has a rectangular through hole 145 at a corner thereof adjacent to the first side plate 142 and far from the third side plate 144.

Figure 2:
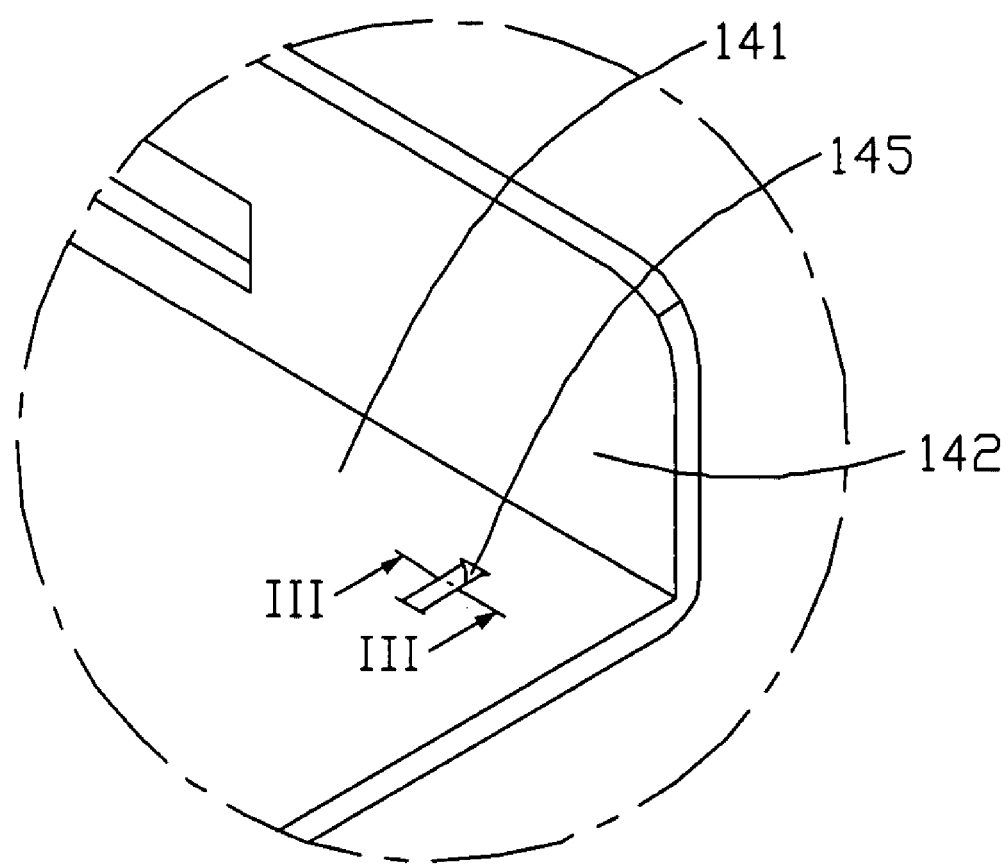
FIG. 2 is an enlarged view of a circled portion II of FIG. 1.
Figure 3:
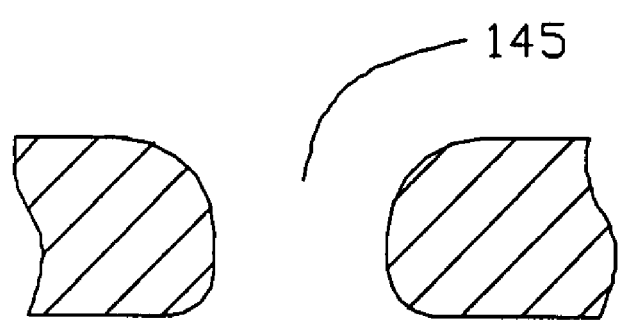
FIG. 3 is an enlarged, cross-sectional view taken along line III-III of FIG. 2.

Referring also to FIG. 2 and FIG. 3, a horizontal area of a middle portion of the through hole 145 is less than a horizontal area of each of an upper portion of the through hole 145 and a lower portion of the through hole 145.

The backlight unit 13 includes a light guide plate (LGP) 15 for guiding light, a linear lamp 16 adjacent to the light guide plate 15, a metal reflector 17, a pair of rubber stoppers 18, and a plastic frame 19.

The lamp 16 can for example be a cold cathode fluorescent lamp (CCFL). The reflector 17 essentially surrounds three sides of the lamp 16, and reflects light radiating from the lamp 16 toward the light guide plate 15. The rubber stoppers 18 are engaged around two ends of the lamp 16 respectively, to protect and fix the lamp 16. The plastic frame 19 is used to accommodate the light guide plate 15, the lamp 16, the reflector 17, and the rubber stoppers 18.

Figure 4:
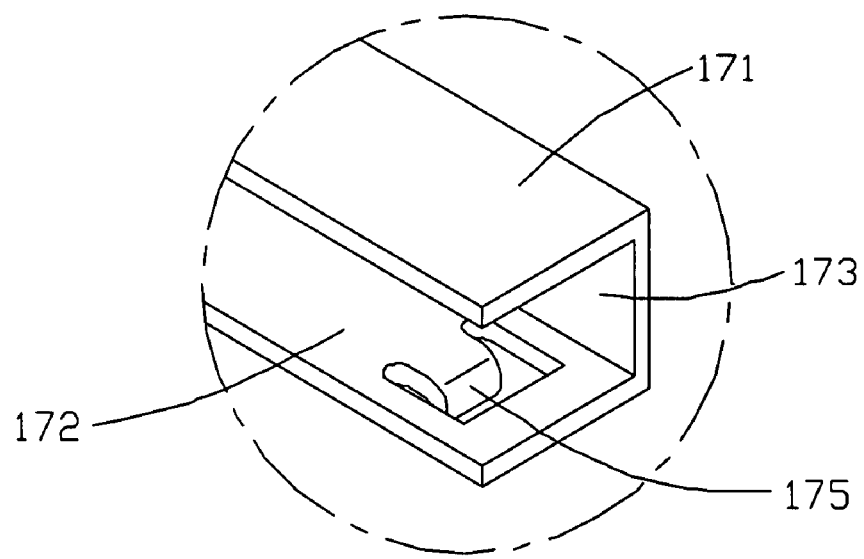
FIG. 4 is an enlarged view of a circled portion IV of FIG. 1.

Referring also to FIG. 4, the reflector 17 includes an upper wall 171, a lower wall 172 opposite to the upper wall 171, a lateral wall 173 perpendicularly interconnecting the upper wall 171 and the lower wall 172, and a hook 175 formed at an end of the lower wall 172.

The hook 175 corresponds to the through hole 145. A transverse cross-section of the hook 175, taken at any part of the hook 175 from a base portion thereof to a free end thereof, is rectangular. A thickness of the hook 175 is substantially the same as or slightly greater than the horizontal area of the middle portion of the through hole 145, and is less than each of the horizontal area of the upper portion of the through hole 145 and the horizontal area of the lower portion of the through hole 145. Thereby, the through hole 145 can interferentially receive the hook 175 therein such that the hook 175 is firmly engaged in the through hole 145.

Figure 5:
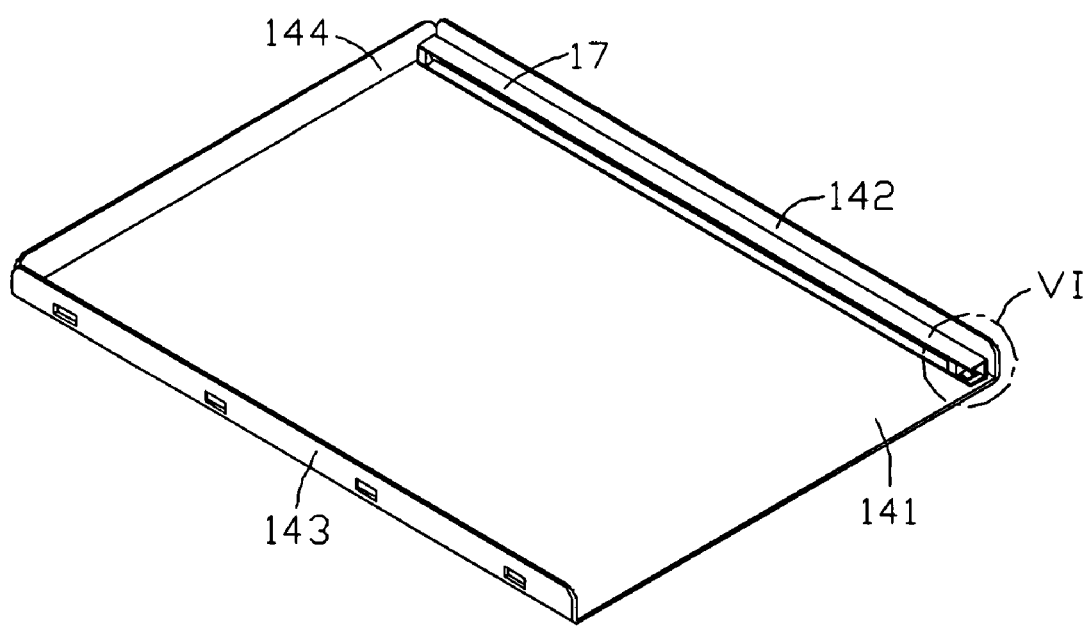
FIG. 5 is an assembled view of the reflector and the bottom frame of the LCD device of FIG. 1.
Figure 6:
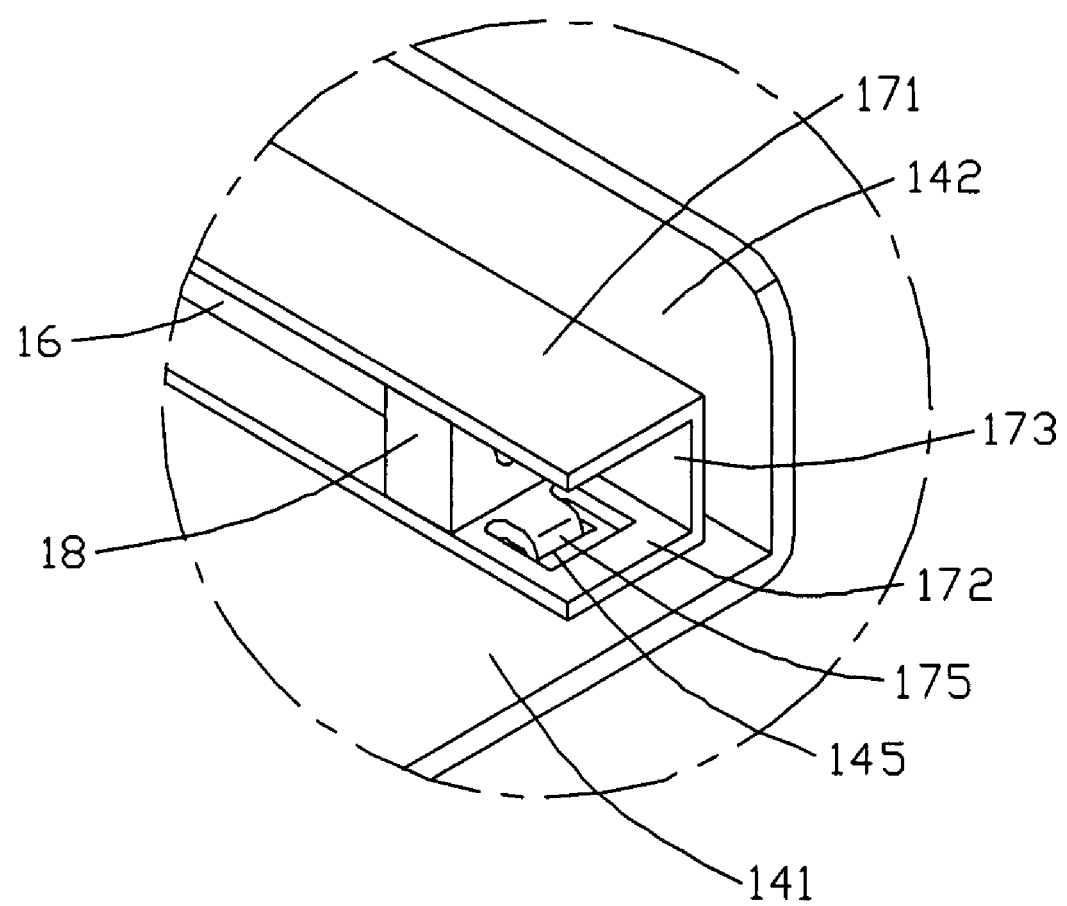
FIG. 6 is an enlarged view of a circled portion VI of FIG. 5.
Figure 7:
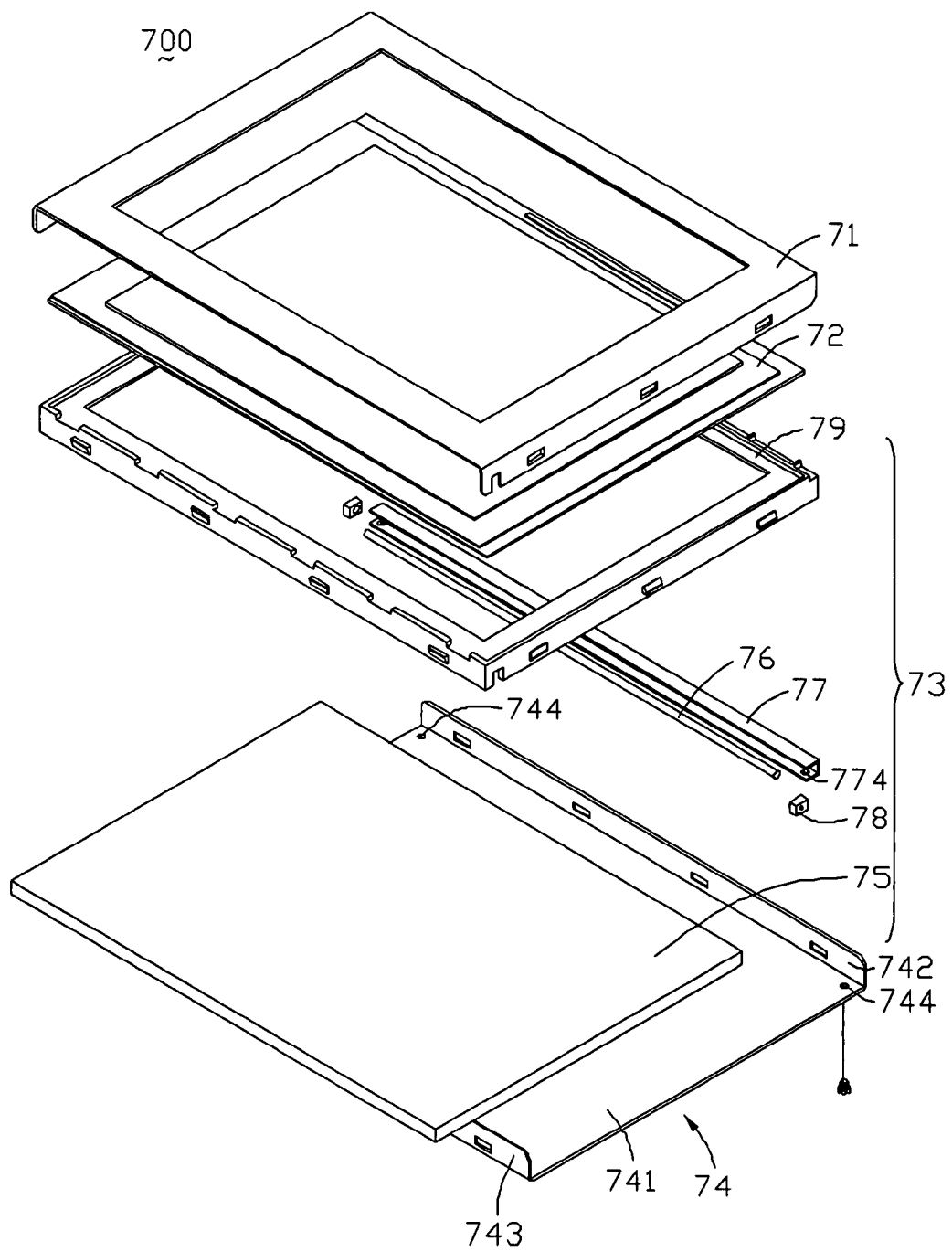
FIG. 7 is an exploded, isometric view of a conventional LCD device, the LCD device including a reflector and a bottom frame.
Figure 8:
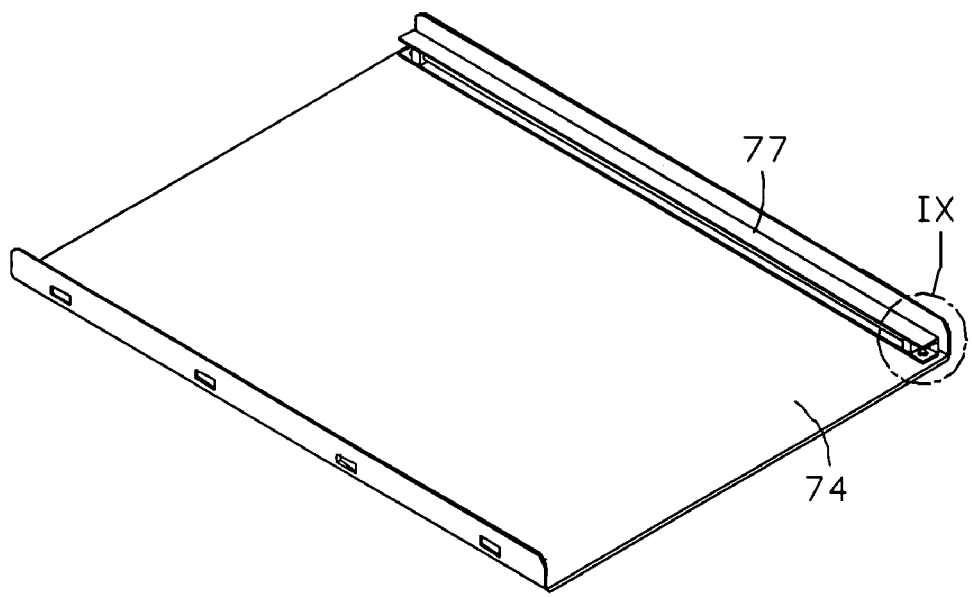
FIG. 8 is an assembled view of the reflector and the bottom frame of the LCD device of FIG. 7.
Figure 9:
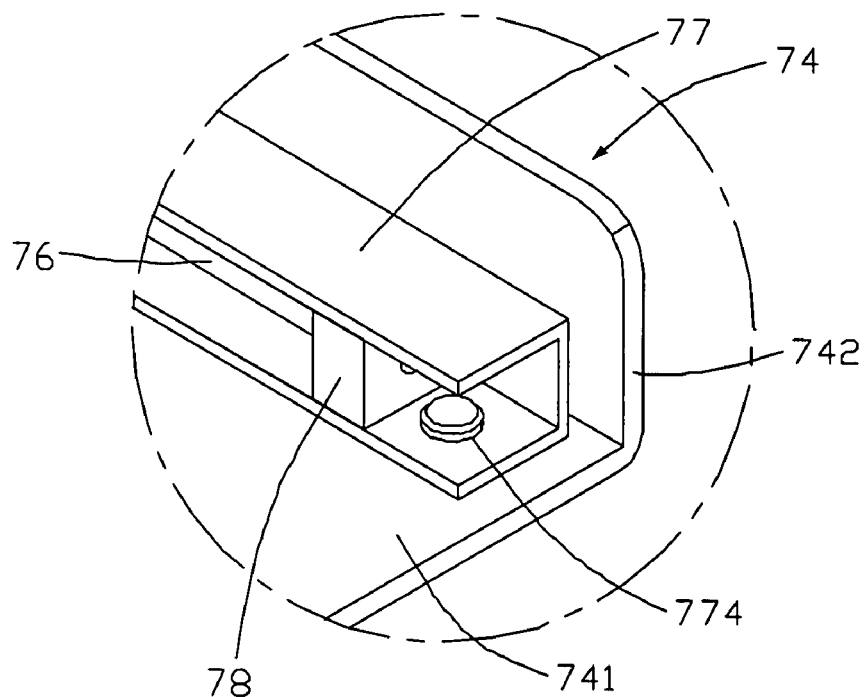
FIG. 9 is an enlarged view of a circled portion IX of FIG. 8.

Referring also to FIG. 5 and FIG. 6, assembly of the LCD device 100 is as follows. The two rubber stoppers 18 are engaged around the two ends of the lamp 16 respectively. The lamp 16 with the rubber stoppers 18 is received in the reflector 17, with the rubber stoppers 18 being deformably and interferentially received between the upper and lower walls 171, 172 of the reflector 17. An end of the reflector 17 without the hook 175 is placed against an inner surface of the third side plate 144. The hook 175 is pushed into the through hole 145 and is interferentially fixed in the through hole 145. Thus, the reflector 17 having the lamp 16 and the rubber stoppers 18 is fixed to the bottom frame 14. Next, the LGP 15 and the plastic frame 19 are received in the bottom frame 14, with a long edge of the LGP 15 facing the lamp 16. Detents (not labeled) of the plastic frame 19 are engaged in slots (not labeled) of the first and second side plates 142, 143 of the bottom frame 14. Thus, a bottom cavity (not labeled) of the plastic frame 19 accommodates the LGP 15 and the reflector 17. Then the LCD panel 12 is fitted on top of the plastic frame 19. Finally, the top bezel 11 is attached to the plastic frame 19, with other detents (not labeled) of the plastic frame 19 engaging in slots (not labeled) of the top bezel 11. Thus, the LCD device 100 is assembled.

Unlike conventional LCD devices, the reflector 17 of the LCD device 100 is fixed in position by means of the engagement of the hook 175 in the through hole 145. The process of assembly of the LCD device 100 is simple and convenient.

Further or alternative embodiments may include the following. In one example, the hook 175 can be formed at any suitable position of the lower wall 172 or of the lateral wall 173. Correspondingly, the through hole 145 can be formed in the bottom plate 141 or the first side plate 142 according to the position of the hook 175.

In another example, the bottom frame 14 can include two or more through holes 145, and the reflector 17 can include two or more hooks 175 formed thereat according to the positions of the through holes 145.

In a further example, the through hole 145 can be triangular, round, or have another suitable shape. Correspondingly, the transverse cross-section of the hook 175 can be triangular, round, or have another suitable shape.

In a still further example, the through hole 145 can be formed in the lower wall 172 or the lateral wall 173 of the reflector 17. Correspondingly, the hook 175 can be formed at the bottom plate 141 or the first side plate 142 of the bottom frame 14.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of shape, size, and arrangement of parts) within the principles of the invention to the full extent indicated by the broad general meaning of the terms in which the appended claims are expressed.

What is claimed is:

1. A liquid crystal display device comprising:
a first frame;
a liquid crystal panel;
a backlight unit configured for providing uniform light for the liquid crystal panel, the backlight unit comprising a reflector and a lamp received and fixed in the reflector, the reflector comprising a hook; and
a second frame cooperating with the first frame to define a space receiving the liquid crystal panel and the backlight unit, the second frame comprising a through hole, the hook engaging in the through hole thereby facilitating fixing of the reflector to the second frame such that the lamp is fixed to the second frame;
wherein the reflector comprises an upper wall, a lower wall, and a lateral wall between the upper wall and the lower wall, the second frame comprises a rectangular bottom plate, a first side plate and a second side plate extending from opposite sides of the bottom plate, and a third side plate extending from another side of the bottom plate between the first side plate and the second side plate, the through hole formed at a corner of the bottom plate adjacent to the first side plate and far from the third side plate of the second frame and at a position thereof where the second frame and the reflector abut each other, and one end of the reflector abutting against the third side plate.

2. The liquid crystal display device of claim 1, wherein a thickness of the hook is substantially the same as or slightly greater than a corresponding narrowest width of the through hole.

3. The liquid crystal display device of claim 2, wherein a transverse cross-section of the hook has a shape selected from the group consisting of rectangular, triangular, and round.

4. The liquid crystal display device of claim 3, further comprising two rubber stoppers engaged around two ends of the lamp, wherein the rubber stoppers together with the lamp are received in the reflector.

* * * * *